Patented Oct. 13, 1953

2,655,364

UNITED STATES PATENT OFFICE 2,655,364

INSTALLATION FOR THE PRODUCTION OF HOT GASES UNDER PRESSURE

Pierre Edmond Jules Marie Maldague, Seraing, Belgium, assignor to Societe Anonyme John Cockerill, Seraing, Belgium, a Belgian company Application October 31, 1950, Serial No. 193,160
In Belgium November 10, 1949

1 Claim. (Cl. 263—19)

The present invention relates to installations for the production of hot gases under pressure; for example, for the production of hot blast for blast furnaces.

It is an object of the invention to provide an installation for the production of hot gases under pressure having the advantages of comparably low cost of manufacture and maintenance, and simplicity and flexibility of operation.

The invention comprises the installation of turbines of an identical construction to be used in the individual plants; only the shape and the arrangement of the orifices of the turbines for the inlets and outlets of the gases are differently shaped in conformity with the connecting pipes; also, the compressors may have an identical shape. In this manner, the installation costs of the plants can be greatly reduced.

A characterizing feature of the invention is the application of turbines and compressors of the type used in aviation gas turbines, which have a smaller weight than turbines ordinarily used for the production of the compressed gases for the operation of a blast furnace.

The arrangement of the means for the production of hot and compressed gas in conformity with the invention is illustrated in the attached drawings, in which Fig. 1 is a diagrammatical view of the plant;

Figure 1:
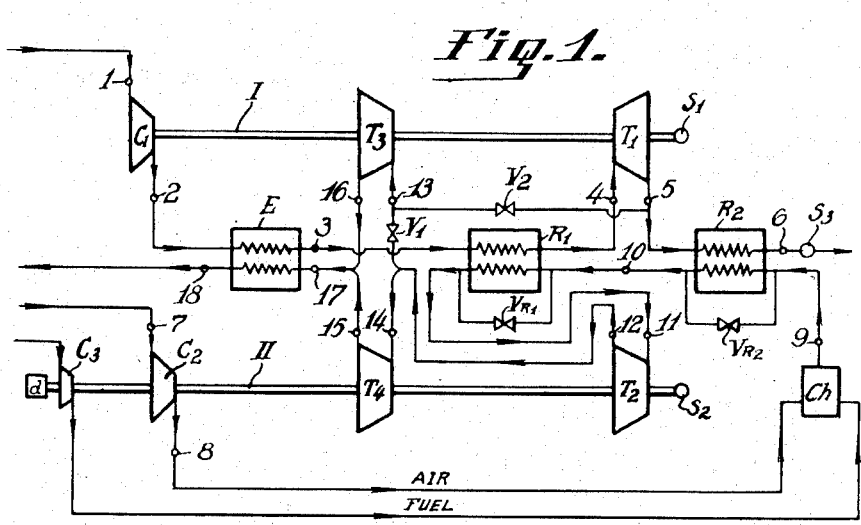

The hot compressed gas to be produced in conformity with the invention and hereafter referred to as gas A, for instance the blast of a blast furnace, is sucked in through pipe 1 at a pressure $p1$ by a compressor C1 which discharges it at 2 at a pressure $p2$ considerably above the pressure $p3$ and at which it will be used. The gas A leaving the compressor C1 is then re-heated in a heater E which it leaves at 3 then in a heater R1 which it leaves at 4; the gas A is then expanded from a pressure $p2$ to a pressure $p3$ in a gas turbine T1 which it leaves at 5 in order to undergo a final re-heating in a heater R2 which it leaves at 6 in order to be used.

The heaters E, R1 and R2 are heated by combustion gases flowing in the following circuit; the combustion air is taken in by the compressor C2 at 7 and is discharged at 8; during this phase, the compressor C2 increases the atmospheric pressure of the air to a pressure $p'2$ which is about equal to the pressure $p2$ of the gas A, as above defined. The combustion air leaving the compressor C2 enters the combustion chamber Ch, into which liquid or gaseous fuel is entered to produce a combustion gas. The temperature and the pressure of the fuel is raised by the apparatus C3 to a pressure $p2$.

The combustion gas leaves the combustion chamber Ch at 9, is cooled in the heat exchanger R2, and leaves at 10; thereafter the combustion gas is further cooled in the heat exchanger R1; it leaves at 11. This cooled gas enters a gas turbine T2, in which it is expanded from pressure $p'2$ to pressure $p'3$, which is to be about equal to pressure $p3$. The combustion gases leaving the turbine T2 at 12 are divided into two substantially equal portions. One of these portions is expanded by entering the gas turbine T4 at 14 and departing at 15; the other portion of gas is expanded simultaneously in the gas turbine T3 entering the same at 13 and leaving it at 16.

The turbines T3 and T4 are operated into an expansion, which is about equal to the atmospheric pressure. The combustion gases leaving the turbines T3 and T4 at 15 and 16, respectively, are reunited in order to enter the heat exchanger E at 17; here they are cooled before being finally released into the atmosphere at 18.

The shafts of compressor C1, turbine T1 and turbine T3 are coupled, so that their shafts form a first succession of shafts I. The shafts of compressor C2, apparatus C3, turbine T2 and turbine T4 are coupled, so that their shafts form a second succession of shafts II.

The starting of the plant is commenced with closing valve V1 in the pipe line leading to turbine T3. The motor $d$ in the succession of shafts II is started; when the shafts in line II reach a sufficient speed, an ignition is caused in the combustion chamber Ch. If the combustion gas enters turbine T2, the starting motor $d$ is uncoupled, so that now the machines in the line of shafts II operate.

These starting operations may be effected in any known manner. The valve V1 will be opened, if the shafts in line II have the normal speed and the machines grouped in the succession of shaft I may be started by entering the combustion gas into turbine T3.

The speed regulation of the line of shafts I is controlled by a speed regulator S1 which controls a by-pass valve VR1 for burnt gases that pass through the heater R1. The opening of this valve causes a reduction in the temperature of the gas A at the inlet to the turbine T1 and therefore a reduction in the power supply for this turbine T1 which has the effect of retarding the rotational speed of the line of shafts I. Conversely the closing of the valve VR1 causes an acceleration of the rotational speed of the line of shafts I.

Speed regulation of the line of shafts II is effected by a speed regulator S2 which controls the entry of fuel into the combustion chamber Ch. The reduction in the delivery of fuel causes a reduction in the temperature of the combustion gases at the entrance to the turbine T2 and therefore a reduction in the power supply for this turbine T2 which has the effect of retarding the rotational speed of the line of shafts II. Conversely the closing of the valve VR1 causes an acceleration of the rotary speed of the line of shafts II.

Regulation of the gas A at 6 is effected by a thermostat S3 that controls a by-pass valve VR2 for the combustion gases which pass through the heater R1. Regulation of the pressure of the gas A at 6 is effected by a one way valve V2 that is positioned between the points 5 and 13; this permits to direct towards the turbine T3 a part of the gas A leaving the turbine T1 in the event that an increase of the pressure 16 tends to slow down the speed of the line of shafts I.

In an installation according to the invention the deliveries by weight of the gas A flowing through the turbine T1 and of the combustion gas flowing through the turbine T2 are substantially equal under normal conditions of operation; moreover, the relation of the pressure $p2$ to the pressure $p3$ is chosen in such a manner that the volumetric delivery of the combustion gas at the outlet from the turbine T2 will be substantially equal to twice the amount of the volumetric delivery of these gases at the point 11 of entry to this turbine. From this results the possibility, when the pressure $p3$ is about two atmospheres, of using a single type of fixed and movable blades and rotor for the turbines T2, T3 and T4. Furthermore, if the specific volumes of the gas A and the combustion gas are alike or nearly alike under the same conditions of temperature and pressure, the rotor and the fixed and movable blades of the turbine T1 can be identical with the corresponding elements common to the turbines T2, T3 and T4.

The installations according to the invention fully exploit the possibilities provided by the fact that the turbines T1, T2, T3 and T4 are identical except in the formation and arrangement of the inlet and outlet gas orifices.

When the specific volumes of the gas A and the combustion air in the compressors C1 and C2 are similar these compressors may have similar rotors and diffusors. The installation according to this invention fully exploits this possibility owing to the fact that the compressors C1 and C2 are identical except for the formation and arrangement of the orifices for the inlet and outlet of gases.

The advantages of an installation according to the invention arises from the above mentioned characteristics. In fact the similarity of the compressors and the turbines leads to a considerable simplification in the research, for the design and construction of the component parts and considerably reduces the number of essential spare parts, with the result that the cost of manufacture and maintenance is considerably reduced. The reduced obstructiveness of the installation according to the invention arises from the fact that it is possible to arrange the various parts in a small space owing to the fact that the number of compression and expansion apparatus are grouped into independent lines of shafts.

The flexibility of operation of the installation according to the invention stems from the great variety in the conditions of operation which are made possible by the optional regulation in the speeds of the two lines of shafts and of the temperature and pressure of the gas A produced. The simplicity of operation of the installation according to the invention arises directly from the fact that all operations for the regulation or variation of the operating conditions are controlled only by three separate devices S1, S2 and S3. Several particularly advantageous embodiments according to the invention are possible and the characteristics of these are mentioned below.

One embodiment comprises compressors C1 and C2 having identical centrifugal rotor wheels preferably of a type made in large numbers, for example, aviation gas turbines.

Figure 2:
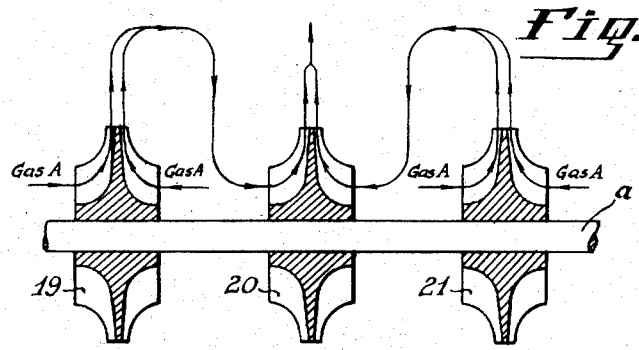
Fig. 2 is a longitudinal sectional view of a compressor used for the compression of the gas or of the combustion air.

By way of example but not limitation Fig. 2 illustrates diagrammatically a compressor rotor according to this particular embodiment of this invention. The rotor comprises three identical double entry centrifugal wheels 19, 20 and 21 mounted on a common spindle $a$. The gas A enters the outer wheels 19 and 20 by the inlets to these wheels. The gas A leaving the wheel 19 after compression therein passes to a diffusor and eventually to an intermediate cooler (this apparatus may be of any known type) and is then led to the entry of the central wheel 20 adjacent to the wheel 19. The gas A leaving the wheel 21 after compression therein passes to a diffusor and eventually to an intermediate cooler (this apparatus can be of any known type) and is then led to the entry of the central wheel 20 adjacent the wheel 21. The gas A leaving the wheel 20 passes to a diffusor from which it is directed towards the discharge end of the compressor.

When the fuel used in the installation according to the invention is a known combustible liquid the compressor C2 is a compressor for combustive air identical with the compressor C1 for the gas A except for the formation and arrangement of the inlet and outlet orifices. In this case the apparatus C3 will be a pump for combustible liquid coupled in the line of shafts II.

When the fuel used in an installation according to the invention is a weak gas, for example, blast furnace gas, the apparatus C3 and the compressor C2 are combined in a single compressor C2 identical with C1. In this later case the identical rotors of the compressors C1 and C2 can be composed, for example, of an odd number of centrifugal wheels including a central double entry wheel and a median wall.

Figure 3:
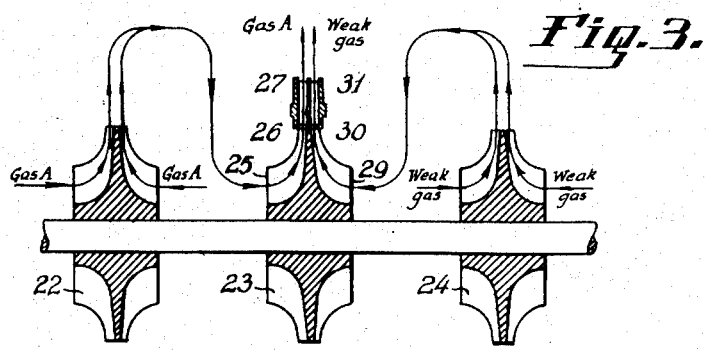
Fig. 3 is a longitudinal sectional view of a modified compressor used when the fuel employed in the plant is a weak gas.

By way of example Fig. 3 illustrates a rotor of this later type. The circuit for the gas A in the rotor illustrated in Fig. 3 is identical with the circuit for gas A in the rotor illustrated in Fig. 2. The combustive air circuit in the rotor illustrated in Fig. 3 is as follows: the combustive air enters in the outer wheel 22 by each of its inlets, the combustive air leaves the wheel 22 after compression therein and passes into a diffuser and eventually into an intermediate cooler (this apparatus can be of any known type) and it is then led to the inlet 25 of the central wheel 23 adjacent the wheel 22. The combustive air which leaves the wheel 23 at 26 passes into a diffuser 27 into which it is directed towards the delivery end. The circuit for fuel gas in the rotor as illustrated in Fig. 3 is as follows: the combustible gas enters in the outer wheel 24 from each of its inlets, the fuel gas leaving the wheel 24 after compression therein passes to a diffuser and eventually to an intermediate cooler (this apparatus can be of any known type) and is then led to the inlet 29 of the central wheel 23 adjacent the wheel 24. The fuel gas leaving the wheel 23 at 30 then passes into a diffuser 31 into which it is directed towards the delivery end. It may be observed that the combustive air and the fuel gas remain separate in the compressor C2, of which the rotor is illustrated in Fig. 3, except in the very small space between the median wall of the wheel 23 and the separation wall of the diffusers 27 and 31. The smallness of this space checks any appreciable mixing of the air and gas.

Figure 4:
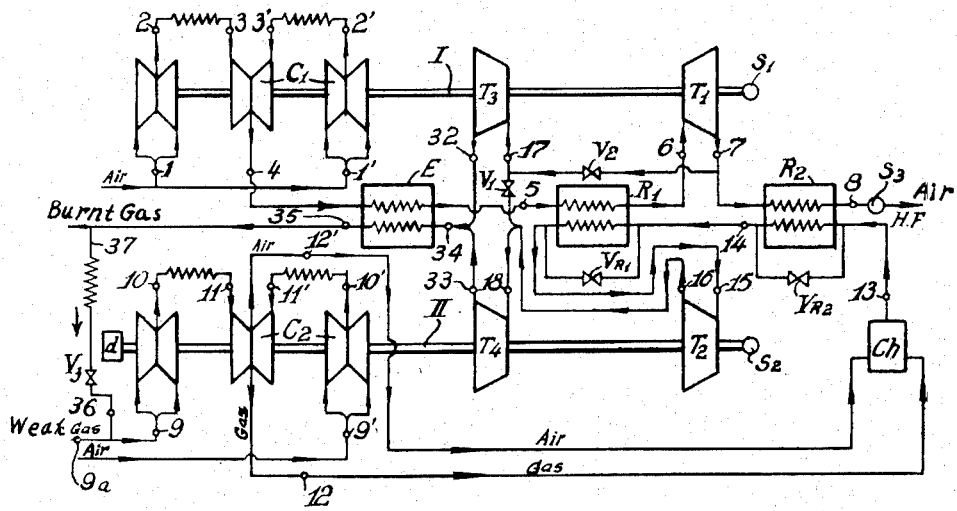
Fig. 4 is a diagrammatical view of a plant for use of a weak gas.

When an installation according to the invention comprises a single compressor C2 for combustive air and weak gas the variation in the combustion temperature controlled by the regulator S1 is obtained by admitting to the weak gas, upstream of the first stage of the compressor C2, of variable amounts of burnt gases previously withdrawn at their escape to the atmosphere and previously cooled to about ambient temperature in a cooler of any known type. By way of example but not limitation Fig. 4 illustrates diagrammatically an installation for the production of a hot blast for a blast furnace, constructed according to the invention, the fuel used being blast furnace gas. In the installation illustrated in Fig. 4, coolers of any known type, for example the water circulation type, are arranged between the points 2 and 3, 2' and 3', 10 and 11, 10' and 11', 35 and 36 of the circuit. The regulator S2 controls the valve V3 for admitting through the conduit 34 and upstream of the compressor C2 cooled burnt gases to the weak gas, C2 thereby to obtain a regulation of the combustion temperature. The compressor C1 is of the type illustrated in Fig. 2 and the compressor C2 is of the type illustrated in Fig. 3. The other components of the installation are similar to those shown in Fig. 1.

By way of example the characteristics of this installation are as follows:

| Points | Output | Kg./h. | Lbs./sec. | Temperatures, ° C. | Actual pressures (atmospheres) |
|---|---|---|---|---|---|
| 1, 1', 9' | Air | 55,000 | 37.7 | 20 | 1 |
| 2, 2', 10' | do | 55,000 | 37.7 | 120 | 2.5 |
| 3, 3', 11' | do | 55,000 | 37.7 | 50 | 2.5 |
| 4 | do | 110,000 | 67.4 | 150 | 5 |
| 5 | do | 110,000 | 67.4 | 325 | 5 |
| 6 | do | 110,000 | 67.4 | 650 | 5 |
| 7 | do | 110,000 | 67.4 | 515 | 2.20 |
| 8 | do | 110,000 | 67.4 | 750 | 2.2 |
| 9 | Weak gas | 55,000 | 33.7 | 20 | 1 |
| 9a | do | 46,200 | 28.3 | 20 | 1 |
| 10 | do | 55,000 | 33.7 | 120 | 2.5 |
| 11 | do | 55,000 | 33.7 | 50 | 2.5 |
| 12 | do | 55,000 | 33.7 | 150 | 5 |
| 12' | Air | 55,000 | 33.7 | 150 | 5 |
| 13 | Burnt gas | 110,000 | 67.4 | 1,210 | 5 |
| 14 | do | 110,000 | 67.4 | 975 | 5 |
| 15 | do | 110,000 | 67.4 | 650 | 5 |
| 16 | do | 110,000 | 67.4 | 515 | 2.2 |
| 17, 18 | do | 55,000 | 33.7 | 515 | 2.2 |
| 32, 33 | do | 55,000 | 33.7 | 400 | 1 |
| 34 | do | 110,000 | 67.4 | 400 | 1 |
| 35 | do | 110,000 | 67.4 | 225 | 1 |
| 36 | do | 8,800 | 5.4 | 40 | 1 |

Total isentropic yield of all the apparatus: 0.8.

What I claim is:

In an apparatus, for use in the production of hot gas at a desired rate and temperature and pressure, in combination: two rotatable shafts spaced from each other; the first of said two shafts comprising a first compressor, a first turbine, and a second turbine, keyed to said first shaft for rotation therewith; the second of said rotatable shafts comprising compressor means, a third turbine, and a fourth turbine, keyed to said second shaft for rotation therewith; a first heat exchanger, a second heat exchanger, a third heat exchanger, and a combustion chamber structure operatively disposed for turbine and compressor connection; said first compressor of said first shaft and said first and second heat exchangers and said second turbine of said first shaft and said third heat exchanger being interconnected in series forming a circuit for the compression and heating and expansion and reheating of said gas; and compressor means of said second shaft and said combustion chamber and said third heat exchanger and said second heat exchanger and said fourth turbine of said second shaft being interconnected in series forming a part of a combustion gas circuit for a first combustion gas expansion, said first turbine of said first shaft and said third turbine of said second shaft being interconnected in parallel to said fourth turbine of said second shaft and forming a succeeding part of said combustion gas circuit for a second combustion gas expansion substantially equally apportioned between said shafts, and said first heat exchanger being interconnected to said first and third turbine completing said combustion gas circuit for the production and expansion and heat exchange of a combustion gas; all of said turbines having substantially identical structural dimensions and construction, and said first compressor and at least a portion of said compressor means having substantially identical structural dimensions and construction, whereby the outputs by weight of said hot gas and of said combustion gas will be substantially equal during normal operation.

PIERRE EDMOND JULES
MARIE MALDAGUE.

References Cited in the file of this patent

UNITED STATES PATENTS

| Number | Name | Date |
|---|---|---|
| 2,422,131 | Ruegg | June 10, 1947 |
| 2,457,594 | Nettel et al. | Dec. 28, 1948 |
| 2,478,504 | Ruegg | Aug. 9, 1949 |
| 2,539,744 | Keller | Jan. 30, 1951 |

FOREIGN PATENTS

| Number | Country | Date |
|---|---|---|
| 590,222 | Great Britain | July 11, 1947 |